US 9,056,568 B2

(12) United States Patent
Matsumoto et al.

(10) Patent No.: US 9,056,568 B2
(45) Date of Patent: Jun. 16, 2015

(54) SEAT BACK STRUCTURE FOR VEHICLE

(75) Inventors: Tomoki Matsumoto, Wako (JP); Koji Sano, Wako (JP); Yoshitomo Oka, Wako (JP); Tatsuya Terauchi, Wako (JP); Masayuki Yamaguchi, Tochigi (JP); Kenichi Niitsuma, Tochigi (JP)

(73) Assignees: HONDA MOTOR CO., LTD., Tokyo (JP); TS TECH CO., LTD., Asaka-Shi (JP)

( * ) Notice: Subject to any disclaimer, the term of this patent is extended or adjusted under 35 U.S.C. 154(b) by 23 days.

(21) Appl. No.: 13/993,959

(22) PCT Filed: Nov. 25, 2011

(86) PCT No.: PCT/JP2011/077193
§ 371 (c)(1),
(2), (4) Date: Jun. 13, 2013

(87) PCT Pub. No.: WO2012/086364
PCT Pub. Date: Jun. 28, 2012

(65) Prior Publication Data
US 2013/0270887 A1    Oct. 17, 2013

(30) Foreign Application Priority Data
Dec. 24, 2010   (JP) ................................. 2010-287584

(51) Int. Cl.
*B60N 2/427*   (2006.01)
*B60N 2/42*    (2006.01)
(Continued)

(52) U.S. Cl.
CPC .............. *B60N 2/4228* (2013.01); *B60N 2/427* (2013.01); *B60N 2/42709* (2013.01);
(Continued)

(58) Field of Classification Search
CPC ............ B60N 2/44; B60N 2/70; B60N 2/449; B60N 2/643; B60N 2/4228; B60N 2/5825; B60N 2/42709; B60N 2/42745; B60N 2/427
USPC .......................... 297/216.13–216.14, 452.18, 297/218.1–218.5, 452.3, 452.32, 452.34
See application file for complete search history.

(56) References Cited

U.S. PATENT DOCUMENTS 3,727,980 A * 4/1973 Tischler .................... 297/452.53
4,558,905 A * 12/1985 Natori ........................ 297/452.6
(Continued)

FOREIGN PATENT DOCUMENTS

| CN | 101549661 | 10/2009 |
|---|---|---|
| JP | 3-3246 | 1/1991 |

(Continued)

OTHER PUBLICATIONS

Japanese Office Action with English translation dated Mar. 11, 2014, 4 pages.
(Continued)

*Primary Examiner* — Daniel J Troy
*Assistant Examiner* — Ryan A Doyle
(74) *Attorney, Agent, or Firm* — Rankin, Hill & Clark LLP

(57) ABSTRACT

A seat back structure for a vehicle according to one aspect of the present invention including a headrest, a seat back frame, a pad disposed in front of a surface of the seat back frame, a backrest surface of the pad, and right and left side supports each provided on either side of the backrest surface in a seat width direction, in which a right slit portion and a left slit portion are provided between the backrest surface and the right and the left side supports, respectively, each of the right slit portion and the left slit portion penetrating the pad in the thickness direction of the pad and extending in a vertical direction of the pad, and the right and the left slit portions are spaced apart from each other in the seat width direction.

14 Claims, 6 Drawing Sheets

(51) Int. Cl.
*B60N 2/64* (2006.01)
*B60N 2/58* (2006.01)
*B60N 2/70* (2006.01)
*B60N 2/44* (2006.01)

(52) U.S. Cl.
CPC ........... *B60N 2/42745* (2013.01); *B60N 2/643* (2013.01); *B60N 2/70* (2013.01); *B60N 2/449* (2013.01); *B60N 2/5825* (2013.01)

(56) References Cited

U.S. PATENT DOCUMENTS

| | | | |
|---|---|---|---|
| 4,579,389 A * | 4/1986 | Shimbori et al. | 297/452.6 |
| 4,609,226 A | 9/1986 | Yoshizawa | |
| 4,893,873 A * | 1/1990 | Iwamoto et al. | 297/452.26 |
| 5,338,098 A * | 8/1994 | Ohnishi | 297/452.6 |
| 5,641,204 A * | 6/1997 | Lhuissier et al. | 297/452.6 |
| 6,003,939 A * | 12/1999 | Nakai et al. | 297/216.13 |
| 6,386,577 B1 | 5/2002 | Kan et al. | |
| 2008/0136237 A1 | 6/2008 | Kayumi et al. | |
| 2012/0306256 A1 * | 12/2012 | Okuyama et al. | 297/452.6 |
| 2013/0033084 A1 * | 2/2013 | Sei et al. | 297/452.58 |
| 2013/0270878 A1 * | 10/2013 | Adachi et al. | 297/216.14 |
| 2013/0320744 A1 * | 12/2013 | Sakamoto | 297/452.58 |

FOREIGN PATENT DOCUMENTS

| | | |
|---|---|---|
| JP | 11-034707 | 2/1999 |
| JP | 2008-113811 | 5/2008 |
| JP | 2010-036807 | 2/2010 |
| JP | 2010-104485 | 5/2010 |
| JP | 2010-179748 | 8/2010 |
| JP | 2010-214973 | 9/2010 |

OTHER PUBLICATIONS

European Search Report dated Apr. 8, 2014, 6 pages.
International Search Report filed in PCT/JP2011/077193.
Chinese Office Action with partial English translation dated Feb. 4, 2015, 9 pages.

* cited by examiner

SEAT BACK STRUCTURE FOR VEHICLE

TECHNICAL FIELD

The present invention relates to a seat back structure for a vehicle.

The present application claims priority based on Japanese Patent Application No. 2010-287584 filed in Japan on Dec. 24, 2010, the disclosures of which are incorporated herein by reference in their entirety.

BACKGROUND ART

A vehicle seat is proposed that protects a portion of the neck of a passenger sitting in the seat when a collision with the vehicle occurs from the rear (hereinafter, referred to as a rear collision) (for example, see Patent Document 1).

The vehicle seat described in Patent Document 1 has a headrest on the upper edge of the seat back. Further, the seat back contains a stress transferring mechanism that works upon receiving a predetermined value or more of the impact load.

The seat back includes a pad member having a side pad member and a center pad member. Between the side pad member and the center pad member, a slit is provided so as to penetrate the pad member from the front side to the rear side. Then, with this slit, the side pad member and the center pad member are configured to have a divided formation (see FIG. 3 in Patent Document 1).

Further, the center pad member is provided with a slit that penetrates the center pad member from the front side to the rear side. With this slit, the center pad member is divided vertically into two pieces (see FIG. 4 of Patent Document 1).

If the vehicle is subjected to a rear collision, the upper body of the passenger is pressed rearward due to the impact load and sinks into the center pad member. Then, the center pad member is bent at the slit, and moves backward while the impact load occurring at the time of the rear collision is effectively transferred to the stress transferring mechanism such as a link mechanism by way of the center pad member. With the stress transferring mechanism operating due to the impact load, the headrest is moved upward while being moved toward the side of the head of the passenger.

As described above, the vehicle seat described in Patent Document 1 reliably receives the head portion of the passenger with the headrest at the time of rear collision, thereby protecting a portion of the neck of the passenger.

RELATED ART DOCUMENT

Patent Document

Patent Document 1: Japanese Patent Application, First Publication No. H11-34707

DISCLOSURE OF THE INVENTION

Problems to be Solved by the Invention

Incidentally, as the vehicle seat described in Patent Document 1 has the center pad member divided vertically into two pieces with the slit, there is a possibility that the center pad member is bent and deforms at this slit when the passenger sits on the seat. This makes it impossible to achieve favorable cushion performance, possibly causing the pad member to locally sink, deteriorating the sitting state.

In view of the facts described above, the present invention addresses a problem of providing a vehicle seat that can protect the portion of the neck of the passenger at the time of rear collision while maintaining a favorable cushion performance.

Means for Solving the Problems

To solve the problem described above, each mode of the present invention employs the following means.

[1] A vehicle seat according to one aspect of the present invention provides a seat back structure for a vehicle having a headrest, a seat back frame, and a pad disposed in front of the seat back frame. In the seat back structure for a vehicle, the pad includes a backrest surface, and a right and a left side supports each provided on either side of the backrest surface in a seat width direction, a right slit portion and a left slit portion are provided between the backrest surface and the right and the left side supports, respectively, each of the right slit portion and the left slit portion having a slit penetrating the pad in the thickness direction of the pad and extending in a vertical direction of the pad, and the right and the left slit portions are spaced apart from each other in the seat width direction.

[2] In the vehicle seat according to [1] above, the slit provided to the right and the left slit portions may be formed by multiple slits, and the slits may be provided so as to be spaced apart from each other in the vertical direction.

[3] In the vehicle seat according to [1] or [2] above, it may be possible that the pad has a skin covering an outer surface thereof; the pad is provided with a suspending groove; the skin is engaged at the inner side of the suspending groove; and the backrest surface is provided with a backrest surface slit penetrating the pad in the thickness direction of the pad.

[4] In the vehicle seat according to any one of [1] to [3] above, a recessed portion, which does not penetrate the pad in the thickness direction, may be provided on a back surface side of the pad so as to extend in the vertical direction.

[5] In the vehicle seat according to [4] above, the pad may have a lining member on the back surface of the pad, and an opening portion extending in the vertical direction may be provided at a position of the lining member corresponding to a bottom portion of the recessed portion.

[6] In the vehicle seat according to [4] or [5] above, the recessed portion may be provided at a center portion in the seat width direction.

[7] In the vehicle seat according to any one of [4] to [6] above, the recessed portion may be formed by multiple recessed portions, and the recessed portions may be provided so as to be spaced apart from each other in the seat width direction.

[8] In the vehicle seat according to [2] above, at least one of the slits included in the left slit portion may be located at a position vertically the same as the position of at least one of the slits included in the right slit portion.

Effect of the Invention

With the vehicle seat according to [1] described above, the slit portion is provided between the backrest surface, and the right and the left side supports, whereby the pad is sectioned between the backrest surface, and the right and the left side supports. With this structure, it is possible to easily move the backrest surface rearwards at the time of rear collision to make the upper body of the passenger sink into the pad. This makes it possible to reduce the distance between the head portion of the passenger and the headrest, and then, cause the headrest to receive the head portion. Thus, it is possible to prevent the portion of the neck of the passenger from rapidly extending or bending, whereby it is possible to protect the portion of the neck.

Further, the right and the left slit portions are spaced apart from each other in the seat width direction (in the horizontal direction), so that, unlike Patent Document 1, the pad is not divided in the vertical direction. With this configuration, the backrest surface of the pad is prevented from bending and deforming, which prevents the pad from partially sinking. This makes it possible to prevent the sitting state of the passenger from deteriorating. Thus, it is possible to protect the portion of the neck of the passenger at the time of rear collision while maintaining favorable cushion performance.

Further, with the vehicle seat according to [2] described above, the right and the left slit portions are each provided with multiple slits arranged so as to be spaced apart from each other in the vertical direction, and the strength of the pad can be adjusted by setting the number or the length or the width of these slits as appropriate. With this configuration, it is possible to adjust the degree of sinking of the passenger into the pad. This prevents the pad from bending and deforming, and the passenger from locally sinking, which make it possible to prevent the sitting state of the passenger from deteriorating during driving. Thus, it is possible to effectively protect the portion of the neck of the passenger at the time of rear collision while maintaining favorable cushion performance.

Further, with the vehicle seat according to [3] described above, even if the vehicle seat has the slit portion provided at the position of the suspending groove, the position of the backrest surface slit is not limited by the position of the suspending groove. Thus, it is possible to dispose the backrest surface slit at any position regardless of design of the seat.

Further, with the vehicle seat according to [4] described above, the recessed portion extending in the vertical direction is provided on the back surface side of the pad, whereby it is possible to increase the surface length of the pad on the back surface side in the seat width direction (in the horizontal direction). With this configuration, it is possible to extend the back surface of the pad in the horizontal direction. This makes it possible to secure the sufficient amount of depth for the upper body of the passenger to sink in the pad at the time of rear collision. Thus, it is possible to effectively protect the portion of the neck of the passenger at the time of rear collision while maintaining favorable cushion performance.

Further, with the vehicle seat according to [5] described above, the opening portion of the lining member is provided at the bottom portion of the recessed portion on the back surface of the pad, which makes it possible to make the lining member elongate in response to the elongation of the back surface of the pad in the horizontal direction. With this configuration, it is possible to secure the sufficient amount of depth for the passenger to sink at the time of rear collision while maintaining the strength of the pad with the lining member provided on the back surface of the pad. Thus, it is possible to protect the portion of the neck of the passenger at the time of rear collision.

Further, with the vehicle seat according to [6] described above, the center portion of the back surface of the pad elongates, whereby it is possible to secure the sufficient amount of depth for the passenger to sink at the time of rear collision. Thus, it is possible to effectively protect the portion of the neck of the passenger at the time of rear collision while maintaining favorable cushion performance.

Further, with the vehicle seat according to [7] described above, the back surface of the pad elongates throughout the width direction of the seat, whereby it is possible to secure the sufficient amount of depth for the upper body of the passenger to sink. Thus, it is possible to protect the portion of the neck of the passenger at the time of rear collision while maintaining favorable cushion performance.

Further, with the vehicle seat according to [8] described above, portions located between the backrest surface, and the right and the left side supports deform symmetrically in the right-left direction at the time of rear collision. With this configuration, the backrest surface moves rearwards without shifting in the right-left direction, whereby the head portion of the passenger can be reliably received by the headrest.

EMBODIMENTS OF THE INVENTION

Hereinbelow, a vehicle seat according to an embodiment of the present invention will be described with reference to the drawings. Note that, for the purpose of convenience, in the description below, the forward direction when the vehicle travels is also referred to as the front direction; the rearward direction when the vehicle travels is also referred to as the rearward direction; the width direction of the vehicle is also referred to as the horizontal direction; and the upward and the downward directions in the vertical direction of the vehicle are also referred to as the upward and the downward, respectively.

Figure 1:
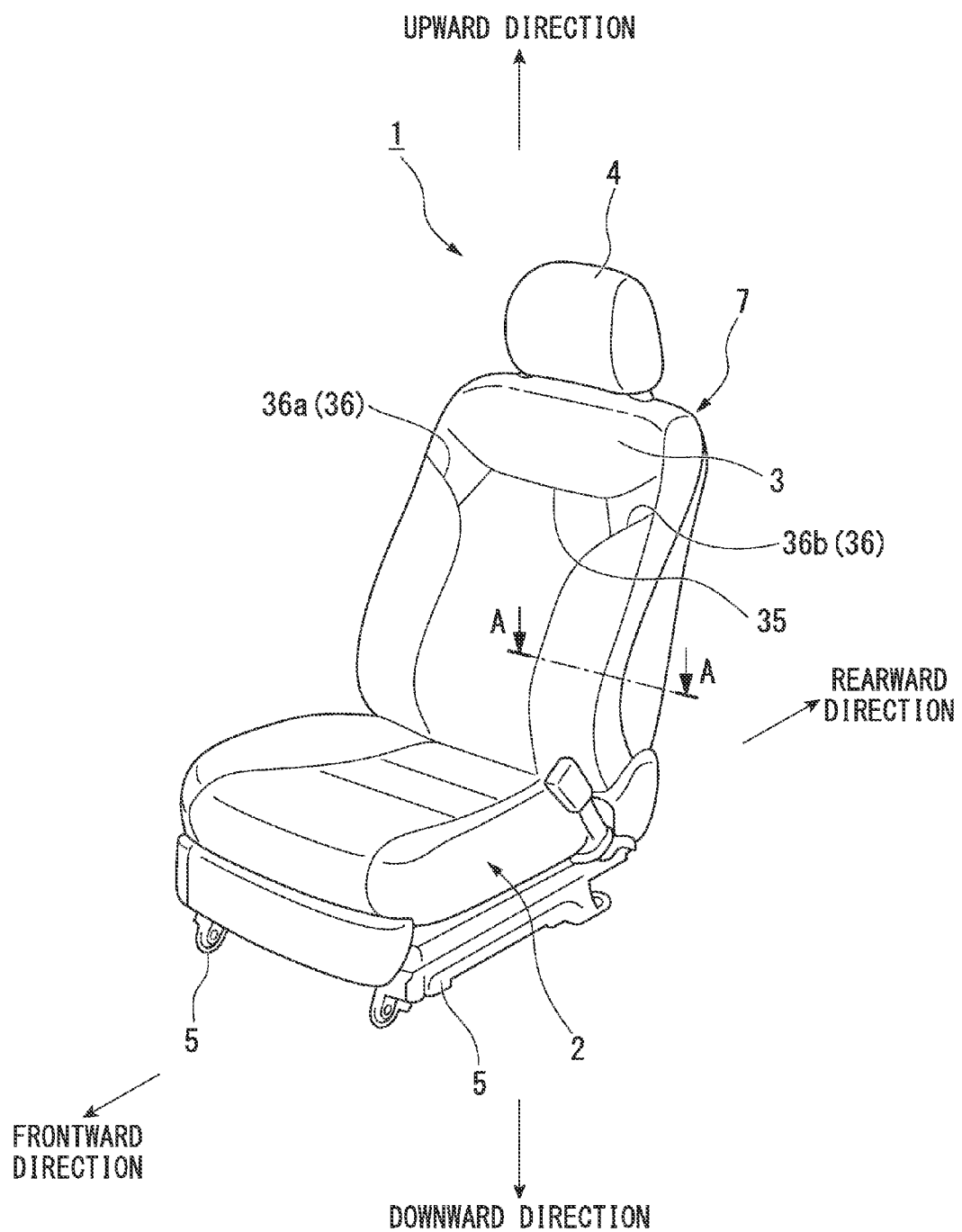
FIG. 1 is a perspective view illustrating a vehicle seat when viewed from the front.

FIG. 1 is a perspective view illustrating a vehicle seat 1. This vehicle seat 1 is a separate-type seat provided on the driver's seat side or passenger's seat side.

As illustrated in FIG. 1, the vehicle seat 1 includes a seat cushion 2 that supports a portion of the body ranging from the hip to the thigh of the passenger, a seat back 3 that supports a portion of the body ranging from the shoulder to the waist of the passenger, and the headrest 4 that supports the head portion of the passenger.

The seat cushion 2 is supported by a floor of the vehicle (not illustrated) by way of a seat rail 5 so as to be able to slide in the front-and-rear direction. The seat back 3 has the lower end portion jointed with the rear end portion of the seat cushion 2 in a hinged manner, and is supported in a tiltable manner with a hinge shaft (not illustrated) acting as a center. The headrest 4 is supported by the upper portion of the seat back 3 in a manner such that they can approach or be separated from each other.

Figure 2:
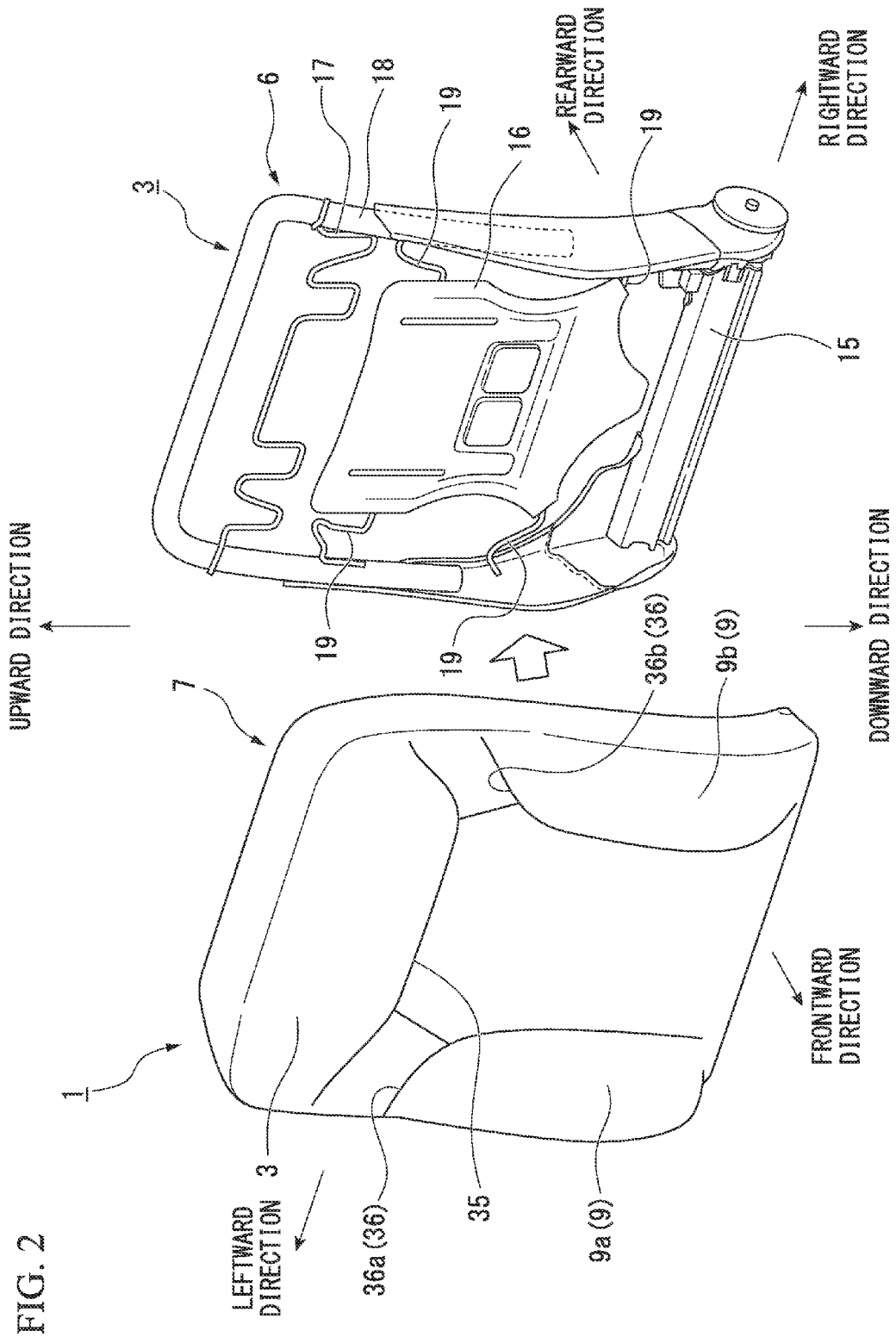
FIG. 2 is an exploded perspective view illustrating the seat back.

FIG. 2 is an exploded perspective view illustrating the seat back 3.

As illustrated in FIG. 2, the seat back 3 has a seat back frame 6 serving as a frame, and a cushion unit 7 attached to the front portion of the seat back frame 6.

The seat back frame 6 has a frame portion 18 formed integrally by a substantially U-shaped skeletal frame pipe, and a member unit 15 disposed below the frame portion 18 and is formed into a substantially rectangular shape when viewed from the front thereof.

In the lower portion of the frame portion 18, a support mat 16 is stretched with elastic force applied by a reinforcing wire 19. Above the support mat 16, a support wire 17 is stretched with elastic force. The cushion unit 7 is supported by the support mat 16 and the support wire 17.

[Pad]

Figure 3:
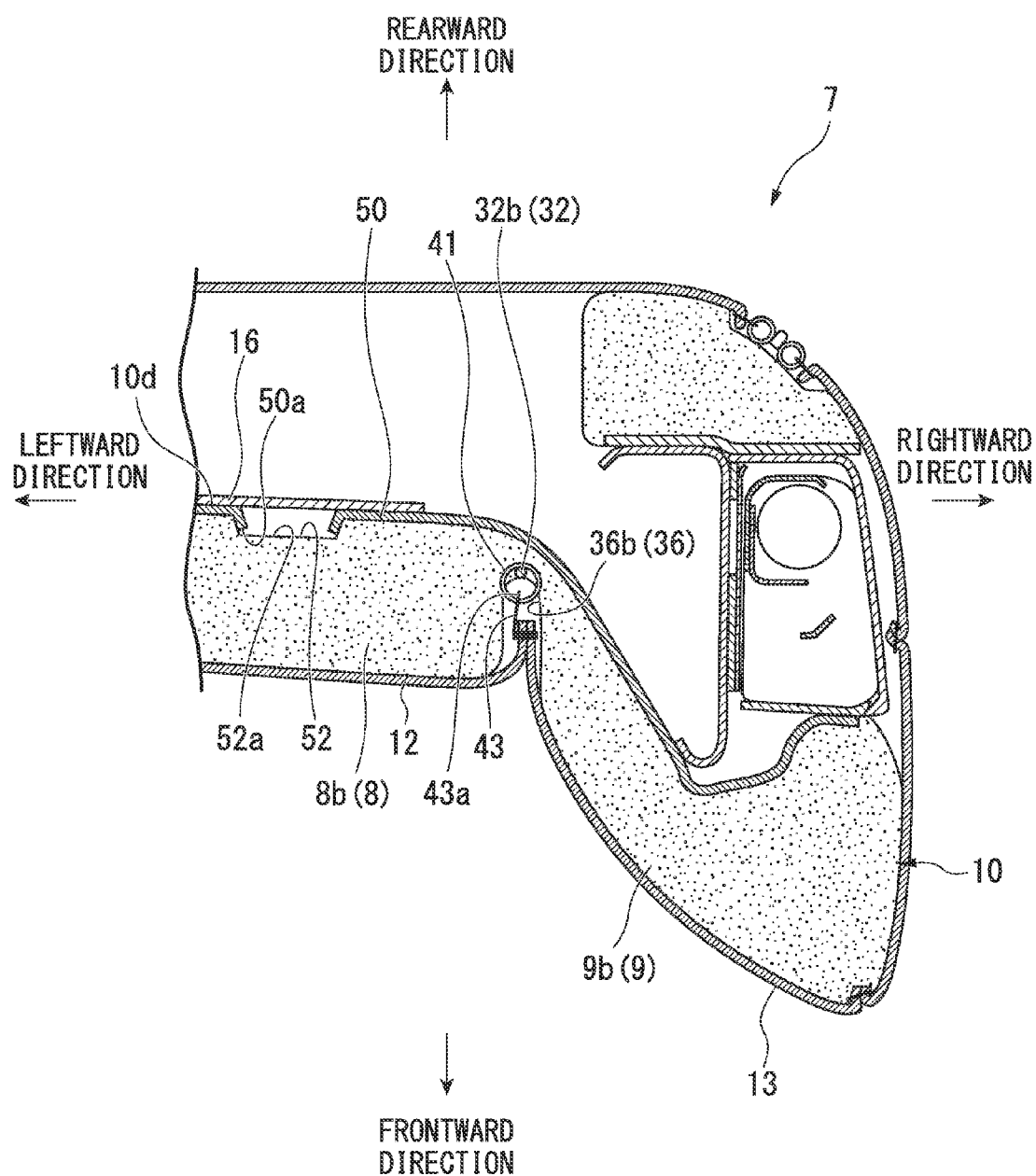
FIG. 3 is a sectional view illustrating a schematic configuration taken along the line A-A in FIG. 1.

FIG. 3 is a sectional view illustrating a schematic configuration taken along the line A-A in FIG. 1.

Figure 4:
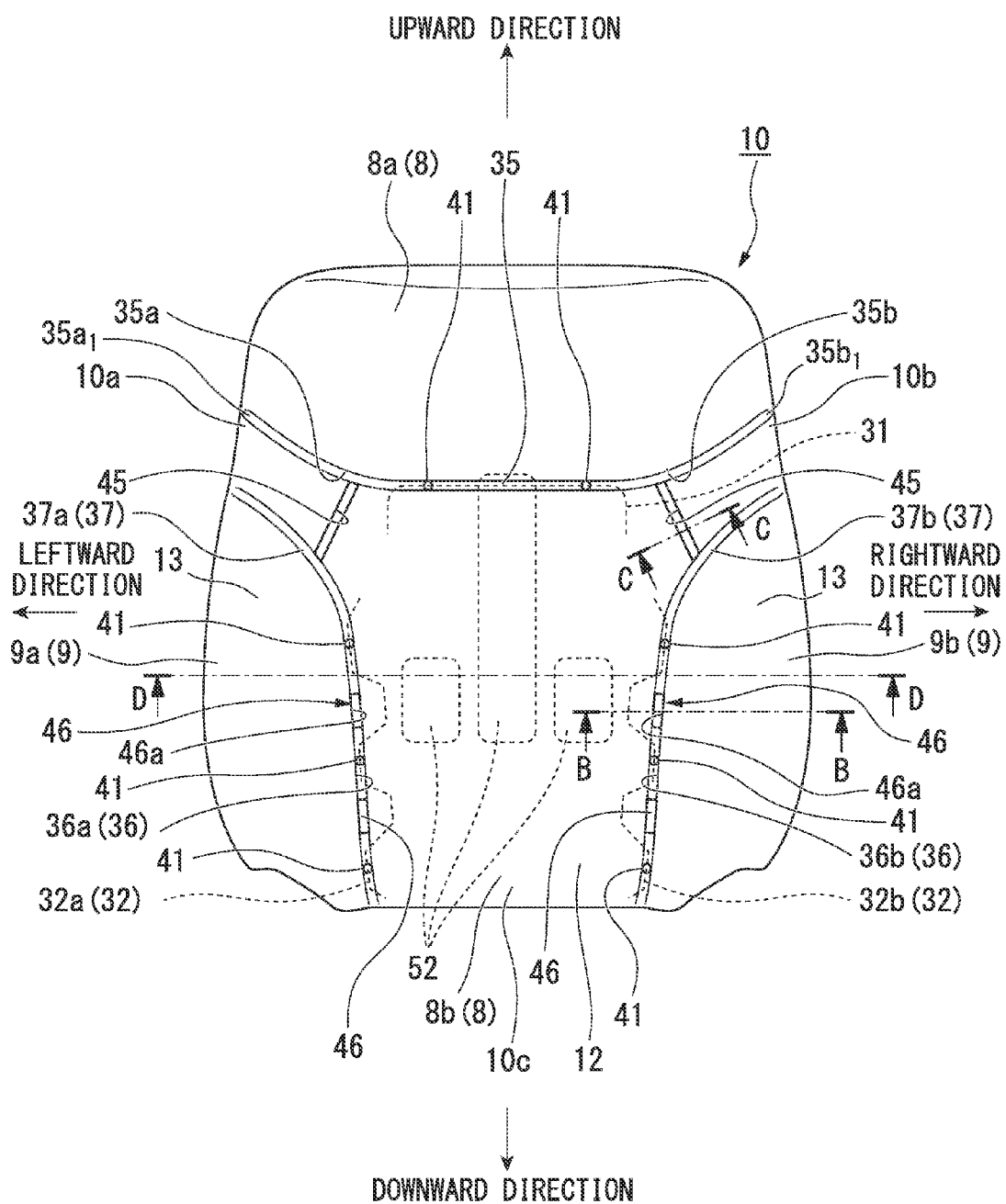
FIG. 4 is a front view illustrating a pad.

FIG. 4 is a front view of a pad 10.

As illustrated in FIG. 3 and FIG. 4, the cushion unit 7 has a pad 10 having a substantially rectangular shape when viewed on the plane and formed by a thick cushion material such as urethane foam and skins 12 and 13 covering the outer surface of the cushion material.

The pad 10 has a backrest surface 8 that supports a back surface of a passenger's body ranging from the flank to the waist of the passenger, and a side support 9 (left side support 9a and right side support 9b) that supports side portions of the passenger ranging from the flank to the waist.

The skins 12 and 13 are made, for example, out of cloth or leather, and include a front skin 12 covering the backrest surface 8 and a side skin 13 covering the side support 9.

As illustrated in FIG. 4, the pad 10 is provided with the backrest surface 8 including an upper area 8a and a lower area 8b disposed below the upper area 8a. The lower area 8b is provided substantially at the center in the horizontal direction (width direction) of the pad 10 so as to extend in the vertical direction. Then, the upper area 8a has a width extending in the vertical direction of approximately one-third of the pad 10 from the upper edge.

Further, between the upper area 8a and the lower area 8b of the backrest surface 8, an upper suspending groove 35 extends in the horizontal direction when viewed from the front direction so as to have a constant width and constant depth. The upper suspending groove 35 is provided at the lower part of the upper area 8a so as to extend along the horizontal direction when viewed from the front direction. An end edge portion $35a_1$ on the left side and an end edge portion $35b_1$ on the right side of the upper suspending groove 35 are provided so as to be sloped upward toward a side portion 10a on the left side of the pad 10 and a side portion 10b on the right side of the pad 10, respectively. The front skin 12 is fixed so as to be pulled into the upper suspending groove 35. Note that the width and the depth of the upper suspending groove 35 are set depending on applications.

At the rearward of the bottom portion (not illustrated) of the upper suspending groove 35, an upper suspending wire 31 is embedded in the pad 10 so as to extend along the upper suspending groove 35. The upper suspending wire 31 is inserted into an engagement ring 41. The engagement ring 41 is partially embedded into the pad 10 so as to be exposed from the bottom portion of the upper suspending groove 35.

In the pad 10, a left side support 9a on the left side and a right side support 9b on the right side when viewed from the front direction are provided at both side portions (left and right) of the lower area 8b of the backrest surface 8. The side supports 9a and 9b protrude forward relative to the backrest surface 8. Further, the side supports 9a and 9b are provided in a manner such that the amount of protrusion forward thereof gradually increases with distance toward the outer side of the seat in the seat width direction (in the horizontal direction).

Between the lower area 8b of the backrest surface 8 and the right and the left side supports 9a, 9b, side suspending grooves 36 (left-side suspending groove 36a and right-side suspending groove 36b) having a constant width and constant depth are provided so as to extend along the vertical direction. The side suspending grooves 36a and 36b each curve diagonally downwards from the side portions 10a and 10b of the pad 10 when viewed from the front direction, and forms a curved portion 37 (left-side curved portion 37a and right-side curved portion 37b). The side suspending grooves 36a, 36b located further below the curved portions 37 extend toward a lower end 10c of the pad 10, and are provided on the side surface of the lower area 8b so as to extend along the vertical direction. The front skin 12 and the side skin 13 are fixed so as to be pulled into the side suspending grooves 36a, 36b.

[Slit]

In the pad 10, side slit portions (slit portion) 46 are provided so as to extend along the left-side suspending groove 36a and the right-side suspending groove 36b. These side slit portions 46 are each formed by a group of slits having one or more slits 46a therein. In the case where each of the side slit portions 46 has multiple slits 46a, these slits 46a are separated from each other in the vertical direction.

It should be noted that it is preferable that at least one of the slits 46a contained in the side slit portion 46 on the left side in the horizontal direction and at least one of the slits 46a contained in the side slit portion 46 on the right side are located at the same position with respect to the vertical direction.

In this embodiment, a description will be made of a case, as an example, in which each of the right and the left side slit portions 46 has two slits 46a. Note that the length of each of the slits 46a in the vertical direction is set depending on applications.

Figure 5:
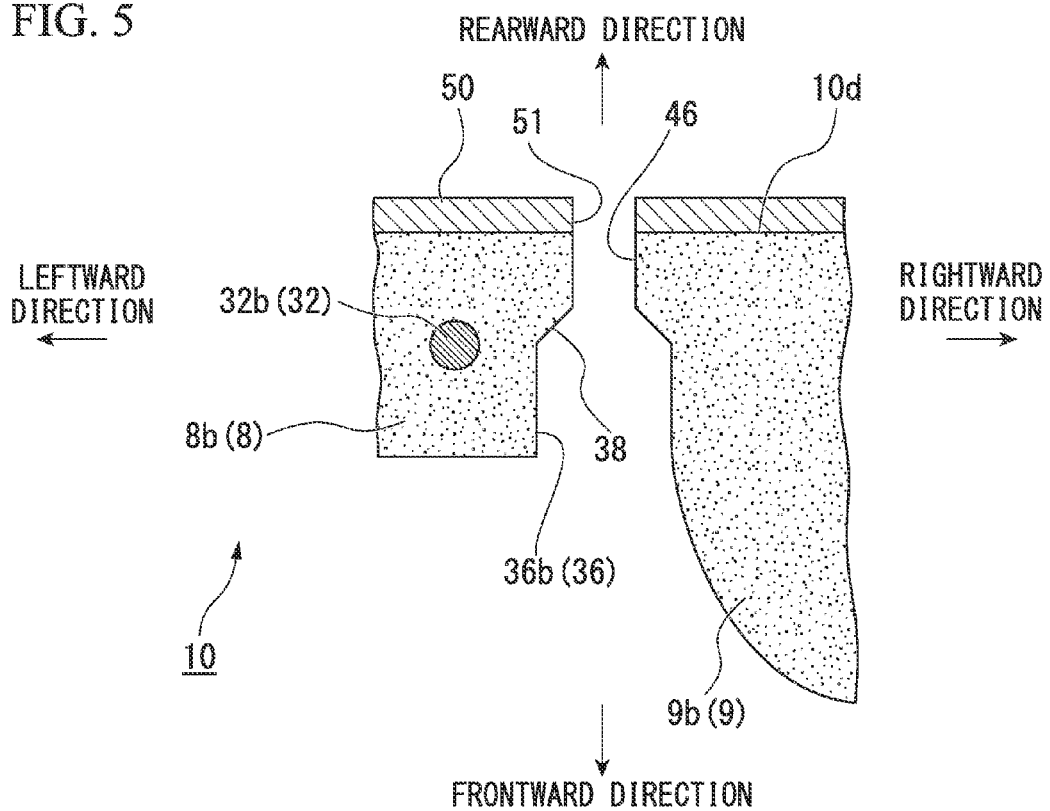
FIG. 5 is a sectional view illustrating a schematic configuration taken along the line B-B in FIG. 4.

FIG. 5 is a sectional view illustrating a schematic configuration taken along the line B-B in FIG. 4. Note that each of the side slit portions 46 basically has a similar configuration. Thus, only the side slit portion 46 provided to the right-side suspending groove 36b will be described below, and explanation of the side slit portion 46 provided to the left-side suspending groove 36a is omitted.

As illustrated in FIG. 5, the slit 46a of the side slit portion 46 is formed so as to be penetrated from the bottom portion 38 of the right-side suspending groove 36b toward the back surface 10d of the pad 10 in the front and rear direction (thickness direction) of the pad 10.

The width in the horizontal direction of the slit 46a is set to be substantially constant. Further, the center of the slit 46a in the horizontal direction is substantially matched with the center of the right-side suspending groove 36b in the horizontal direction. The width of the slit 46a is set so as to be narrower than that of the right-side suspending groove 36b and is set for example so as to be approximately half of the width of the right-side suspending groove 36b. Note that, the back surface 10d of the pad 10 is provided with a lining member 50, which will be described later. The lining member 50 has a through-hole 51 at a position corresponding to the side slit portion 46.

As illustrated in FIG. 3, side suspending wires 32 (32a, 32b) are embedded in a position at the rear of the bottom portion of the side suspending groove 36. The side suspending wire 32 is inserted into the engagement ring 41. Then, the side suspending wire 32 is embedded in the pad 10 so as to be partially exposed from the bottom portion of the side suspending groove 36.

Here, as described above, the side slit portion 46 is provided along the side suspending groove 36. Thus, as illustrated in FIG. 4, the side suspending wire 32 is provided at a position corresponding to the slit 46a in such a way that the wire is bent in the horizontal direction toward the center of the seat while avoiding the slit 46a. With this configuration, the side suspending wire 32 is not exposed to the inside of the slit 46a.

As illustrated in FIG. 3, the front skin 12 and the side skin 13 are fixed at the inside of the upper suspending groove 35 and the inside of the side suspending groove 36 as described above.

More specifically, an engagement part 43 having a hook portion 43a is stitched at an end portion on the upper suspending groove 35 side and an end portion on the side suspending groove 36 side of each of the front skin 12 and the side skin 13. The hook portion 43a is engaged with the engagement ring 41 having the upper suspending wire 31 and the side suspending wire 32 inserted therein, whereby the front skin 12 and the side skin 13 are pulled to the inner side of the upper suspending groove 35 and the inner side of the side suspending groove 36. This makes it possible to engage the front skin 12 and the side skin 13 with the inner side of the pad 10.

Figure 6:
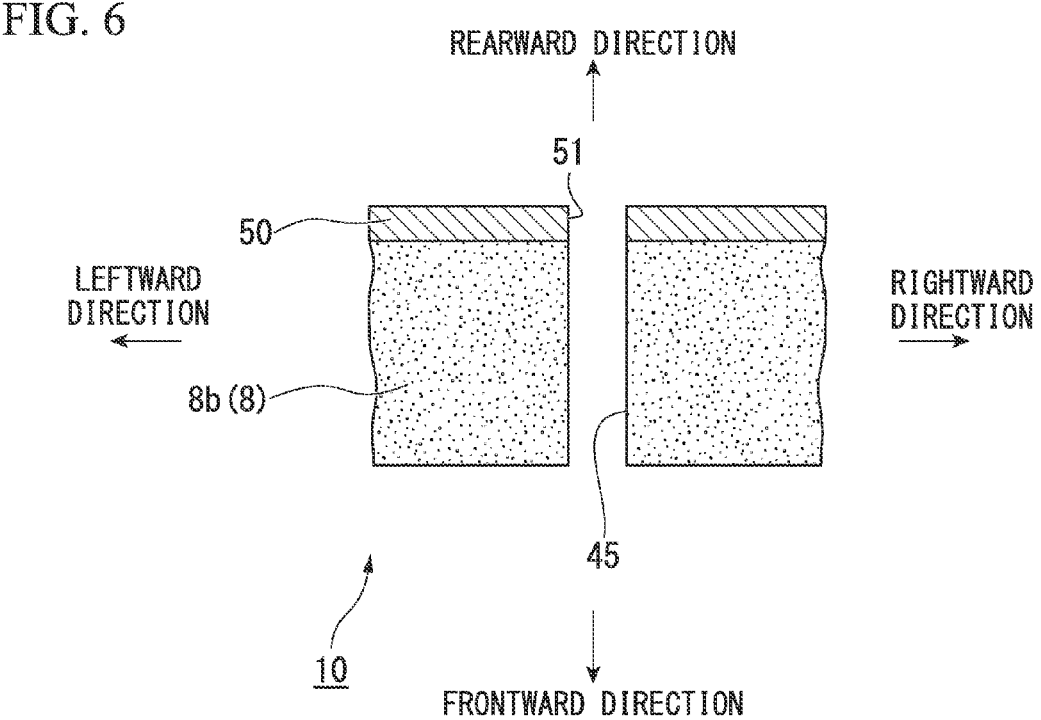
FIG. 6 is a sectional view illustrating a schematic configuration taken along the line C-C in FIG. 4.

FIG. 6 is a sectional view illustrating a schematic configuration taken along the line C-C in FIG. 4.

As illustrated in FIG. 4 and FIG. 6, between the upper suspending groove 35 and the side suspending grooves 36 (36a, 36b) on the backrest surface 8 of the pad 10, an upper slit (backrest surface slit) 45 is provided so as to penetrate the pad 10 in the front and rear direction (thickness direction).

The backrest surface slit 45 is provided above the side slit portion 46 described above. Further, the backrest surface slit 45 is provided on both sides of the lower area 8b of the backrest surface 8 in the horizontal direction so as to extend along the vertical direction. More specifically, as illustrated in FIG. 4, when viewed from the front direction, the backrest surface slit 45 on the left side is provided so as to connect the left-side curved portion 35a of the upper suspending groove 35 with the left-side curved portion 37a of the left-side suspending groove 36a, and the backrest surface slit 45 on the right side is provided so as to connect the right-side curved portion 35b of the upper suspending groove 35 with the left-side curved portion 37b of the right-side suspending groove 36b.

Further, multiple slits 46a are disposed so as to be separated from each other in the vertical direction, and form a slit group (slit portion) 46.

The width of the backrest surface slit 45 is substantially constant in the horizontal direction and is set so as to be substantially the same as the width of the side slit portion 46 described above. Note that, as with the case with the side slit portion 46, the through-hole 51 is provided at a position corresponding to the backrest surface slit 45 of the lining member 50.

Figure 7:
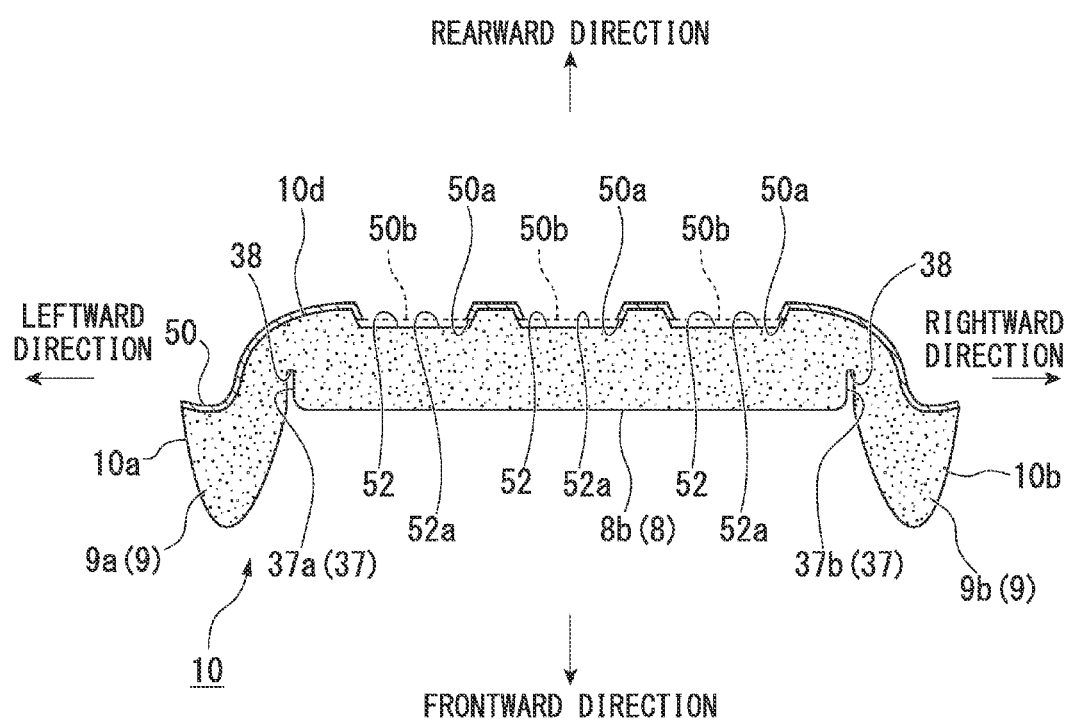
FIG. 7 is a sectional view illustrating a schematic configuration taken along the line D-D in FIG. 4.

FIG. 7 is a sectional view illustrating a schematic configuration taken along the line D-D in FIG. 4.

As illustrated in FIG. 7, the back surface 10d of the pad 10 is provided with recessed portions 52 extending along the vertical direction. The width, the depth, the vertical length, and the number of each of the recessed portions 52 are set depending on applications.

In this embodiment, for example, one recessed portion 52 is provided substantially at a center in the horizontal direction, and one recessed portion 52 is provided on the right and the left sides of the center recessed portion 52. As described above, in this embodiment, three recessed portions 52 in total are provided so as to be arranged in parallel in the horizontal direction. However, the number of the recessed portions 52 is not limited to three, and any number may be set depending on applications.

The back surface 10d provided at the rear of the pad 10 has the lining member 50. The lining member 50 is provided so as to cover the back surface 10d of the pad 10, and extend along the surface of the back surface 10d. The lining member 50 is formed, for example, by a rough blanket and is integrally formed with the pad 10. The lining member 50 is provided in order to prevent noises from occurring due to friction with the support mat 16 (see FIG. 2 and FIG. 3) and prevent damage from occurring in the pad 10.

Further, an opening portion 50a is provided at a position of the lining member 50 corresponding to the bottom portion 52a of the recessed portion 52. The opening portion 50a is formed, for example, by cutting and removing an area 50b of the lining member 50 located at a position corresponding to the bottom portion 52a of the recessed portion 52.

[Operations of This Embodiment]

Next, operations of this embodiment will be described.

When a vehicle has a rear collision, the upper body of a passenger is pressed against the pad 10 due to impact load occurring at the time of collision. At this time, portions of the pad 10 located between the upper area 8a and the lower area 8b of the backrest surface 8 and between the backrest surface 8 and the side support 9 are bent with the backrest surface slit 45 and the side slit portion 46 having one or more slits 46a while the back surface 10d of the pad 10 elongates.

Then, the lower area 8b of the backrest surface 8 moves rearwards, and the upper body of the passenger sinks into the pad 10. After this, the head portion of the passenger moves nearer to the headrest 4 (see FIG. 1), and then, the head portion of the passenger is received by the headrest 4.

[Effect]

According to this embodiment, the side slit portion 46 is provided between the right and the left sides of the backrest surface 8 and the side support 9, and the pad 10 is sectioned between the backrest surface 8 and the right and the left side supports 9. With this configuration, the backrest surface 8 moves rearward at the time of rear collision, whereby it is possible to cause the upper body of the passenger to sink into the pad 10. This makes it possible to reduce the distance between the head portion of the passenger and the headrest 4 at the time of rear collision, and then, cause the headrest 4 to receive the head portion of the passenger. Thus, it is possible to prevent the portion of the neck of the passenger from rapidly extending or bending, whereby it is possible to protect the portion of the neck of the passenger.

Further, the side slit portions 46 are spaced apart from each other in the horizontal direction. Thus, unlike Patent Document 1, the pad 10 is not divided in the vertical direction. With this configuration, the backrest surface 8 of the pad 10 is prevented from bending and deforming, which prevents the pad 10 from locally sinking This makes it possible to prevent the sitting state of the passenger from deteriorating. Thus, it is possible to protect the portion of the neck of the passenger at the time of rear collision while maintaining favorable cushion performance.

Further, according to this embodiment, the pad 10 is provided with the backrest surface slit 45 and the side slit portion 46 having multiple slits 46a spaced apart from each other in the vertical direction, whereby it is possible to adjust the strength of the pad 10 by setting the number of or the length of the backrest surface slits 45 and the slits 46a as appropriate. With this configuration, it is possible to adjust the degree of sinking of the passenger into the pad 10. This makes it possible to prevent the pad 10 from bending and deforming, or prevent the passenger from locally sinking into the pad 10. As a result, it is possible to prevent the sitting state of the passenger from deteriorating during driving. Thus, it is possible to effectively protect the portion of the neck of the passenger at the time of rear collision while maintaining favorable cushion performance.

Incidentally, in general, the positions of the upper suspending groove 35 and the side suspending groove 36 are determined depending on design of the vehicle seat 1. Here, the slit 46a may be formed by using the upper suspending groove 35 and the side suspending groove 36. However, in this case, the position of the slit 46a is limited depending on the positions of the upper suspending groove 35 and the side suspending groove 36. On the other hand, according to this embodiment, since the backrest surface slit 45 is provided to the backrest surface 8, the backrest surface slit 45 can be disposed at any position regardless of the design of the seat.

Further, according to this embodiment, the back surface 10d of the pad 10 is provided with the recessed portion 52 extending in the vertical direction, whereby it is possible to increase the surface length of the back surface 10d of the pad 10 in the horizontal direction. With this configuration, the back surface 10d of the pad 10 can be made elongated in the horizontal direction, whereby it is possible to secure the sufficient amount of depth for the upper body of the passenger to sink into the pad 10 at the time of rear collision. Thus, it is possible to effectively protect the portion of the neck of the passenger at the time of rear collision while maintaining the favorable cushion performance.

Further, according to this embodiment, the opening portion 50a is provided at a position of the lining member 50 corresponding to the bottom portion 52a of the recessed portion 52 on the back surface 10d of the pad 10, whereby the lining member 50 can be elongated so as to correspond to the elongation of the back surface 10d of the pad 10 in the horizontal direction. This makes it possible to secure the sufficient amount of depth for the passenger to sink at the time of rear collision while maintaining the strength of the pad with the lining member 50 provided to the back surface of the pad 10. Thus, it is possible to protect the portion of the neck of the passenger at the time of rear collision.

Further, according to this embodiment, the recessed portion 52 is provided at the center in the horizontal direction, whereby the center portion of the back surface 10d of the pad 10 elongates. This makes it possible to secure the sufficient amount of depth for the passenger to sink at the time of rear collision. Thus, it is possible to effectively protect the portion of the neck of the passenger at the time of rear collision while maintaining the favorable cushion performance.

Further, according to this embodiment, multiple recessed portions 52 are provided so as to be spaced apart from each other in the horizontal direction, whereby the back surface 10d of the pad 10 elongates over the entire horizontal direction of the back surface 10d. This makes it possible to secure the sufficient amount of depth for the upper body of the passenger to sink into the pad 10. Thus, it is possible to effectively protect the portion of the neck of the passenger at the time of rear collision while maintaining the favorable cushion performance.

Further, according to this embodiment, at least one of the slits 46a in the side slit portion 46 on the left side in the horizontal direction is located at the position vertically the same as that of at least one of the slits 46a in the side slit portion 46 on the right side in the horizontal direction, whereby the portions located between the backrest surface 8 and the right and the left side supports 9a, 9b deform symmetrically in the right-left direction at the time of rear collision. With this configuration, the backrest surface 8 can move rearward without shifting in the right-left direction, so that the head portion of the passenger can be reliably received by the headrest 4.

It should be noted that the present invention is not limited to the embodiments described above, and various design modifications may be possible within the scope of the present invention.

The positions, the shapes, the numbers, or other characteristics of the upper suspending groove 35, the side suspending groove 36, the backrest surface slit 45, and the side slit portion 46 described in this embodiment are not limited to those described in this embodiment, and various modifications may be possible.

This embodiment has been described using an example in which the vehicle seat 1 is disposed on the driver's seat side or passenger's seat side. However, this embodiment is not limited to the vehicle seat 1 disposed on the driver's seat side or passenger's seat side. For example, it may be possible to apply this embodiment to various kinds of vehicle seats such as a rear seat of the vehicle.

In this embodiment, the lining member 50 is formed by a rough blanket, and the opening portion 50a is provided to the rough blanket. However, the material of the lining member 50 is not limited to the rough blanket, and it may be possible to employ PP cloth, nonwoven fabric, or other materials. The opening portion 50a can be provided even if the material of the lining member 50 is changed to various materials.

The side suspending wire 32 according to this embodiment is provided at a position corresponding to the slit 46a in such a way that the wire is bent in the horizontal direction toward the center of the seat while avoiding the slit 46a. However, the side suspending wire 32 is not limited to the shape described above, and it may be possible for the side suspending wire 32, for example, to be bent outwards in the horizontal direction so as to avoid the side slit portion 46.

REFERENCE SIGNS LIST

20 Coil
1 Vehicle seat
3 Seat back (seat back structure for a vehicle)
6 Seat back frame
8 Backrest surface
9(9a, 9b) Side support
10 Pad
10d Back surface
12, 13 Skin
45 Backrest surface slit (upper slit)
46 Side slit portion (slit portion)
46a Slit
50 Lining member
50a Opening portion
52 Recessed portion
52a Bottom portion

The invention claimed is:

1. A seat back structure for a vehicle seat, comprising a headrest, a seat back frame, and a pad disposed in front of a surface of the seat back frame, wherein
the pad includes a backrest surface, and right and left side supports each provided on either side of the backrest surface in a seat width direction,
the pad is provided with a right-side suspending groove and a left-side suspending groove, the left-side suspending groove provided to delineate the left side support from the backrest surface, the right-side suspending groove provided to delineate the right side support from the backrest surface, a right slit portion and a left slit portion are provided between the backrest surface and the right and left side supports, respectively, each of the right slit portion and the left slit portion having one or more slits penetrating the pad in a thickness direction of the pad and extending in a vertical direction of the pad, the one or more slits of the right slit portion and the left slit portion defined in the right-side suspending groove and the left-side suspending groove, respectively, the right and left slit portions are spaced apart from each other in the seat width direction, the pad has a skin covering an outer surface thereof, the skin of the pad is engaged at an inner side of the left-side suspending groove and an inner side of the right-side suspending groove, a suspending wire is embedded in portions of the right-side suspending groove or portions of the left-side suspending groove, and the suspending wire is provided at a position which passes around each of the slits of the one or more slits from the right slit portion or the left slit portion.

2. The seat back structure for a vehicle according to claim 1, wherein
the one or more slits of the right or left slit portions are provided so as to be spaced apart from each other in the vertical direction.

3. The seat back structure for a vehicle according to claim 2, wherein
at least one of the slits included in the left slit portion is located at a position vertically the same as at least one of the slits included in the right slit portion.

4. The seat back structure for a vehicle according to claim 1, wherein
the side supports protrude forward relative to the backrest surface, and
the suspending wire is provided at a position corresponding to the one or more slits of the right or left slit portions in such a way that the suspending wire is bent in a horizontal direction toward a center of the seat back structure while avoiding the one or more slits for the slit portion that the suspending wire corresponds to.

5. The seat back structure for a vehicle according to claim 1, wherein
the one or more slits of the right or left slit portions is provided at a position which is below a center of the backrest surface in the vertical direction, and
the backrest surface is provided with a backrest surface slit penetrating the pad in the thickness direction of the pad, the backrest surface slit being provided at an upper side, the upper side located above the center of the backrest surface in the vertical direction.

6. The seat back structure for a vehicle according to claim 5, wherein
the backrest surface slit is provided at both sides with respect to a center of the backrest surface in a horizontal direction, and
a recessed portion is provided in between the right slit portion and the left slit portion.

7. The seat back structure for a vehicle according to claim 6, wherein
the recessed portion is continuously provided until a height which corresponds with the backrest surface slit in between a right suspending wire and a left suspending wire.

8. The seat back structure for a vehicle according to claim 1, wherein
a recessed portion, which does not penetrate the pad in the thickness direction, is provided on a back surface side of the pad so as to extend in the vertical direction, the recessed portion being provided in between the right slit portion and the left slit portion.

9. The seat back structure for a vehicle according to claim 8, wherein
the suspending wire is a right suspending wire and a left suspending wire which are respectively provided at a position corresponding to the right slit portion and the left slit portion, and
the recessed portion is provided in between the right slit portion and the left slit portion in a horizontal direction.

10. The seat back structure for a vehicle according to claim 8, wherein
the pad has a lining member on the back surface side thereof, and
an opening portion extending in the vertical direction is provided at a position of the lining member corresponding to a bottom portion of the recessed portion.

11. The seat back structure for a vehicle according to claim 8, wherein
the recessed portion is provided at a center portion in the seat width direction.

12. The seat back structure for a vehicle according to claim 8, wherein
the recessed portion includes a plurality of recessed portions, and
the recessed portions are provided so as to be spaced apart from each other in the seat width direction.

13. The seat back structure for a vehicle according to claim 1, wherein
the suspending wire is provided so as to avoid the one or more slits such that the suspending wire is not exposed to an inside of each of the one or more slits.

14. A seat back structure for a vehicle seat, comprising a headrest, a seat back frame, and a pad disposed in front of a surface of the seat back frame, wherein
the pad includes a backrest surface, and right and left side supports each provided on either side of the backrest surface in a seat width direction,
the pad is provided with a suspending groove, the suspending groove provided to delineate the left side support or the right support from the backrest surface,
a slit portion is provided between the backrest surface and the right and left side supports, the slit portion having one or more slits penetrating the pad in a thickness direction of the pad and extending in a vertical direction of the pad,
the one or more slits of the slit portion defined in the suspending groove,
the pad has a skin covering an outer surface thereof,
the skin of the pad is engaged at an inner side of the suspending groove,
a suspending wire is embedded in portions of the suspending groove, and
the suspending wire is provided at a position which passes around each of the slits of the one or more slits from the slit portion.

* * * * *